(12) United States Patent
Melamed

(10) Patent No.: US 8,805,184 B2
(45) Date of Patent: Aug. 12, 2014

(54) TECHNOLOGY FOR FAULT ALLOCATION IN PASSIVE OPTICAL NETWORKS (PON)

(75) Inventor: Amitay Melamed, Moshav Satariya (IL)

(73) Assignee: ECI Telecom Ltd., Petach Tikva (IL)

( * ) Notice: Subject to any disclaimer, the term of this patent is extended or adjusted under 35 U.S.C. 154(b) by 179 days.

(21) Appl. No.: 13/166,158

(22) Filed: Jun. 22, 2011

(65) Prior Publication Data

US 2012/0002959 A1    Jan. 5, 2012

(30) Foreign Application Priority Data

Jun. 30, 2010  (IL) .......................................... 206723

(51) Int. Cl.
*H04B 10/00*        (2013.01)
(52) U.S. Cl.
USPC .................. 398/13; 398/20; 398/21
(58) Field of Classification Search
USPC ............................... 398/10, 13, 16, 20, 21, 28
See application file for complete search history.

(56) References Cited

U.S. PATENT DOCUMENTS

| | | | | |
|---|---|---|---|---|
| 4,207,561 | A * | 6/1980 | Steensma ....................... | 340/600 |
| 4,749,247 | A * | 6/1988 | Large ............................... | 398/13 |
| 5,187,362 | A * | 2/1993 | Keeble ..................... | 250/227.15 |
| 5,416,623 | A * | 5/1995 | Dawson et al. ................. | 398/33 |
| 5,500,730 | A * | 3/1996 | Johnson ........................ | 356/73.1 |
| 5,767,956 | A * | 6/1998 | Yoshida ........................ | 356/73.1 |
| 6,009,220 | A * | 12/1999 | Chan et al. ....................... | 385/24 |
| 6,111,676 | A * | 8/2000 | Lemus et al. ..................... | 398/1 |
| 6,771,358 | B1 * | 8/2004 | Shigehara et al. ........... | 356/73.1 |
| 6,807,370 | B2 * | 10/2004 | Harasawa ....................... | 398/13 |
| 6,980,287 | B2 * | 12/2005 | Renard et al. ................ | 356/73.1 |
| 7,310,134 | B2 * | 12/2007 | Kuo ............................. | 356/73.1 |
| 7,343,098 | B2 * | 3/2008 | Gerwe et al. .................. | 398/120 |
| 7,369,763 | B2 * | 5/2008 | Parsons .......................... | 398/16 |
| 7,620,319 | B2 * | 11/2009 | Krimmel ........................ | 398/33 |
| 7,620,513 | B2 * | 11/2009 | Nakayama et al. ............. | 702/84 |
| 7,630,641 | B1 * | 12/2009 | Uhlhorn ......................... | 398/77 |
| 7,809,262 | B2 * | 10/2010 | Mahony et al. ................. | 398/10 |
| 7,848,645 | B2 * | 12/2010 | Healey et al. ................... | 398/16 |
| 8,000,601 | B2 * | 8/2011 | Schofield et al. .............. | 398/40 |
| 8,003,932 | B2 * | 8/2011 | Sikora et al. ............. | 250/227.14 |
| 8,045,174 | B2 * | 10/2011 | Sikora et al. .................. | 356/478 |
| 8,270,828 | B2 * | 9/2012 | Nakajima et al. ............... | 398/28 |
| 8,285,138 | B2 * | 10/2012 | Lewin et al. ................... | 398/16 |
| 8,290,363 | B2 * | 10/2012 | Nakajima et al. .............. | 398/13 |
| 8,326,151 | B2 * | 12/2012 | Lee et al. ......................... | 398/68 |
| 8,390,797 | B2 * | 3/2013 | Woodward et al. .......... | 356/73.1 |
| 8,396,360 | B2 * | 3/2013 | Healey et al. ................... | 398/16 |

(Continued)

FOREIGN PATENT DOCUMENTS

EP        2 086 129 A1      8/2009

*Primary Examiner* — Agustin Bello
(74) *Attorney, Agent, or Firm* — Browdy and Neimark, PLLC

(57) ABSTRACT

A method for allocating faults in a passive optical network (PON) by placing a number of passive unique optical correlators in a number of respective diagnostic points of the PON, each of the passive unique optical correlators being responsive to an optical diagnostic signal by returning a predetermined unique matching signal; by further transmitting the diagnostic optical signal in the PON towards the diagnostic points to receive upstream response signals from the correlators. Upon detecting presence or absence, in the received response signals, of a predetermined unique matching signal expected from a specific optical correlator, judging about a fault in proximity of the respective specific diagnostic point.

7 Claims, 2 Drawing Sheets

(56) References Cited

U.S. PATENT DOCUMENTS

Figure 1:
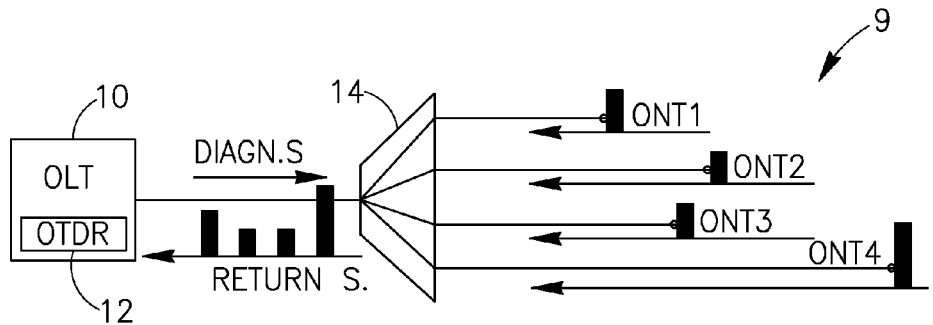

| | | | |
|---|---|---|---|
| 2004/0047543 A1* | 3/2004 | Hiironen et al. | 385/16 |
| 2005/0084266 A1* | 4/2005 | Pohjola et al. | 398/77 |
| 2005/0265719 A1* | 12/2005 | Bernard | 398/58 |
| 2008/0304823 A1* | 12/2008 | Mahony et al. | 398/13 |
| 2008/0317462 A1* | 12/2008 | Chi | 398/13 |
| 2011/0280568 A1* | 11/2011 | Dvir et al. | 398/13 |
| 2012/0002959 A1* | 1/2012 | Melamed | 398/10 |
| 2012/0045205 A1* | 2/2012 | Perron | 398/48 |

* cited by examiner

TECHNOLOGY FOR FAULT ALLOCATION IN PASSIVE OPTICAL NETWORKS (PON)

FIELD OF THE INVENTION

The present invention relates to a technique of allocating faults in passive optical networks (PON) such as GPON, BPON, EPON, GEPON, WDM-PON.

BACKGROUND OF THE INVENTION

A problem of fault allocation in PON stems from the very nature of passive optical networks. Namely, at the PON physical layer, any information transmitted from one (central) Optical Line Termination (OLT) via an optical splitter, will be automatically shared between all fibers outgoing the splitter and terminating with Optical Network Terminations (ONTs). Similarly, information transmitted from any of the ONTs cannot be recognized by OLT as belonging to a specific ONT. This fact is due to the physical characteristics of the PON. Owing to that, if an optical fiber, terminating with a specific ONT, fails or degrades—OLT will be unable to recognize why the ONTs have stopped responding/transmitting. OTDR testing systems are based on analyzing power of returning optical signals, and on the fact that a fiber cut returns light of increased intensity. However, ONTs in PON networks are usually arranged in groups being fed from OLT through optical fibers via one or more optical splitters. Since upstream signals from ONTs are mixed with one another in the common optical fiber leading to OLT, and since the splitters always introduce high attenuation to the OTDR signal (normal attenuation number is 40 dB), the optical signals received from the ONTs are quite difficult for detecting and sorting properly. Any increase of power or duration of probe signals is also problematic due to limitations of the system, such as requirements to safety and resolution.

EP2086129A describes a method used for pinpointing (identifying, diagnosing) a faulty network terminal in a passive optical network (PON) comprising an optical line termination, a splitter upwardly connected the optical line termination (OLT) through a single fibre and network terminals (ONT) connected to the splitter. This method comprises sending from the optical line termination OLT a request to a probed network terminal for transmitting a testing signal, attempting from the requested network terminal to transmit the testing signal, analyzing the signal received at the optical line termination to detect the testing signal, determining whether the probed network terminal is a faulty terminal on the basis of the detection result. The method comprises quite a long interactive process. The active system at the subscriber is quite expensive since requires at least a TDM capability.

US2008304823A describes a technique notifying about determining a location of a fiber cut. For example, a method for determining a location of a fiber cut in a passive optical network (PON) including a plurality of optical network terminations (ONTs) is provided. According to the method, a plurality of base signatures are generated prior to the fiber cut. Each of the base signatures correspond to a known configuration of the plurality of ONTs. In response to the fiber cut, a current signature corresponding to a current configuration of the plurality of ONTs is generated. Whether the current signature matches one of the base signatures is determined. In response to finding a matching base signature, the location of the fiber cut is determined based on the known configuration of the plurality of ONTs corresponding to the matching base signature. The described method has a disadvantage that, for any specific fault in the network, a specific preliminarily generated signature should be posted in the data base of the system. Such a signature should be found and recognized in case that the specific fault occurs. Firstly, it requires a lot of effort from a network designed to predict and arrange signatures for any type of fault in the network and their processing (to build an incremental database, to collect information, to compare it with the database). Secondly, when the network is upgraded, the whole work of preparing signatures should be re-done from the very beginning, to take into account new portions of the network.

OBJECT AND SUMMARY OF THE INVENTION

It is the object of the present invention to propose a simple, passive and cost effective solution for fault allocation in various kinds of PONs.

We keep in mind that a PON comprises an Optical Line Termination (OLT) connected by a common optical fiber to an optical splitter and/or Array of Waveguides (say, in the form of WDM filter), and via it, by corresponding individual optical fibers, to a plurality of Optical Network Terminations (ONTs) which are usually associated with subscribers. The network may comprise more than one of such splitters, and therefore more than one trees of the ONT branches.

The Inventor proposes the following technique. Firstly, providing each of the ONT branches (but probably, not only ONT specifically but—any specific point of interest in the network) with a passive optical correlator respectively adapted for returning a predetermined unique matching signal in response to a diagnostic signal received from the side of OLT (and possibly carrying a unique signature such as a code, a pattern, an image). The matching signal is applied to an upstream signal returning from the correlator towards OLT, said matching signal is further recognized at the side of OLT and is associated with the specific passive optical correlator and the place where it is located.

Formally, the proposed method for allocating faults in a passive optical network (PON) comprises:

placing a number of passive unique optical correlators in a number of respective diagnostic points of the PON, wherein each of the passive unique optical correlators being responsive to an optical diagnostic signal by returning a predetermined unique matching signal;

transmitting the diagnostic optical signal in said PON, towards said diagnostic points, receiving upstream response signals from said number of passive optical correlators placed at said diagnostic points of the PON, detecting presence or absence, in said received response signals, of a predetermined unique matching signal expected from a specific optical correlator out of said correlators, judging about a fault in proximity of a specific diagnostic point, based on the presence or absence and/or a level of said specific matching signal expected from the unique passive optical correlator placed in said specific diagnostic point.

The diagnostic signal may be transmitted using an optical channel/wavelength different from optical channels used for transmitting data in the PON.

The judging may be based on preliminarily stored information on matching signals, the respective passive correlators and their respective locations in the PON.

The diagnostic signal preferably comprises a unique signature suitable to a specific passive optical correlator, so as to receive a matching signal only from the specific optical correlator. The judging then will be based on the preliminarily stored information comprising a plurality of all the unique signatures respectively suitable to specific correlators.

The method may be performed by controllably applying to the optical carrier signal, one by one, different unique signatures from the plurality, to allow controllably checking said diagnostic points.

There is also proposed a diagnostic tool for a PON network, the tool comprising a passive optical correlator to be connected to an optical fiber, and being responsive to an optical diagnostic signal (if applied to the passive optical correlator) by returning a predetermined unique matching signal.

The proposed correlator is a passive device (simple, passive and cost effective, which makes the dramatic difference), the OLT side of the PON is provided with means for transmitting a diagnostic optical signal downstream along the PON (say, via an optical splitter/AWG towards the ONTs) and for receiving response upstream signals from the correlators. The correlators may be switched at least in the individual fibers connected to the ONTs. In one example, the OLT side may be provided with a generator of a diagnostic signal (located inside or outside of the OLT), where the diagnostic signal carries a specific signature (a binary code, a pattern of optical pulses having various duration and amplitude, an image/picture). The OLT side may be provided with a processing unit PU, associated with the OLT and positioned either inside or outside the OLT. The received response upstream signals should be processed for recognition, for example by the processing unit PU.

The generator of the diagnostic signal may incorporate a binary code/pattern generator.

The processing unit PU may detect presence/absence of the "returned" matching signal. Say, the matching signal may be just the reflected diagnostic signal—such as the reflected unique code, pattern or image. However, the matching signal may be in the form of a pulse having a specific level of power. In case of presence of the returned matching signal, PU may also perform measuring of that signal and further processing thereof based on the measurements (say, based on the extent of the signal's attenuation, etc.). In case of absence of the returned matching signal, the processing unit PU is capable of allocating a fault in the PON network, based on the PU's database comprising a list of different unique signatures— codes, patterns or pictures—of the diagnostic signal and a list of locations of the passive correlators respectively corresponding to these different codes/patterns/pictures. Actually, the PU considers the fault to have place in a PON section where the suitable passive optical device (correlator) is located.

The method, first of all, allows identifying specific matching signals, received at the OLT from different ONTs, by the fact of their presence, by using predetermined power threshold values. Whenever detected, the method allows judging about normal or abnormal condition of the ONTs and their associated fiber lines based on the real power amplitude/attenuation/delay of the returned matching signal. The time of response may tell about the real distance of the specific correlator from the OLT.

Each network point equipped with such a correlator may be called a diagnostic point.

If the network comprises more than only the mentioned ONT-associated diagnostic points, the fault allocation may become more accurate. For example, it may allow more accurate estimation of the place of a fiber cut, measuring length of the optical fiber, etc.

Possible implementations of the proposed optical correlator may comprise Liquid crystal reflectors for pixel-based selective reflection adapted for returning selected codes/patterns of a diagnostic signal, CDMA optical solutions, acousto-optic schemes, etc.

An exemplary implementation of the optical correlator may be a scheme where a number of delay elements are arranged in parallel connection, and in such a manner that, all "1"-s of a specific binary code in the diagnostic signal, upon passing the diagnostic signal via the parallel delay elements, coincide in time and become summarized; the sum of these "1"-s forms the matching signal being a peak of energy which, according to the invention, is returned to the OLT side for further processing. Other binary codes, be they applied with the diagnostic signal to the correlator, will not form the expected peak of energy since the effect of the above "correct" summarizing will not take place. Such an implementation is especially suitable for binary codes comprising more than one "1"-s.

There is also provided a novel diagnostic tool for PONs, comprising the mentioned passive optical correlator switched in an optical fiber line. Such a diagnostic tool was never proposed before.

A diagnostic tool for a PON network would comprise a passive optical correlator switched into an optical fiber and being capable of returning a predetermined matching signal in response to a diagnostic signal, in a specific case—the diagnostic signal carrying a unique signature (binary code, pulse pattern, image).

There is further provided a system for fault allocation in a PON network.

The system comprises an OLT connected by optical fibers to a plurality of ONTs, a number of unique passive diagnostic tools positioned at least at diagnostic points associated with said ONTs, the diagnostic tools being capable of returning respective unique matching signals in response to a diagnostic signal;

the OLT being accompanied by a generator of the diagnostic optical signal, a receiver of response upstream signals (with the matching signals) from the diagnostic tools, and by a processing unit with a data base (of known unique matching signals respectively associated with the unique passive diagnostic tools and their places in the PON network), the processing unit being also capable of detecting and recognizing the matching signals in the received upstream signals, comparing thereof with the information stored in the data base and judging about possible faults in the PON in case one or more of the matching signals are not detected or detected with parameters (say, power etc.) different than those expected.

The generator of the diagnostic signal is preferably capable of applying to an optical carrier signal a unique signature at a time, said unique signature causing a respective unique diagnostic tool to return a suitable matching signal.

In this case, the data base may store information on the plurality of unique signatures which should comprise said signatures, the respective matching signals, the respective passive correlators and their respective locations in the PON.

The data base of the system may further comprise information about a plurality of unique signatures respectively associated with the number of diagnostic tools, their places in the PON and the unique matching signals respectively expected in response to said unique signatures; the generator of the diagnostic signal may be capable of controllably and selectively applying said unique signatures to an optical carrier signal.

The unique signature applied to the diagnostic signal may be at least in three forms—a) in the form of a binary word composed from optical pulses, for example a Walsh code, b) in the form of an optical pattern, composed from pulses having various duration, amplitude, etc. c) an optical picture/image. The unique matching signal returned by a diagnostic tool may be at least of the following four forms:—1) in the form of a peak of energy being equal or above a predetermined threshold power, 2) a predetermined binary word; 3) an optical pattern 4) an optical image.

There is also proposed a software product stored on a computer readable non-transitory medium (for example in the mentioned processing unit) and comprising computer implementable instructions and/or data which, when executed by a computer, carry out the above-described method.

BRIEF DESCRIPTION OF THE PREFERRED EMBODIMENTS

The invention will be further described with reference to the following non-limiting examples, in which:

FIG. 1 (prior art) illustrates an example of a conventional diagnostic technique in a PON network.

Figure 2:
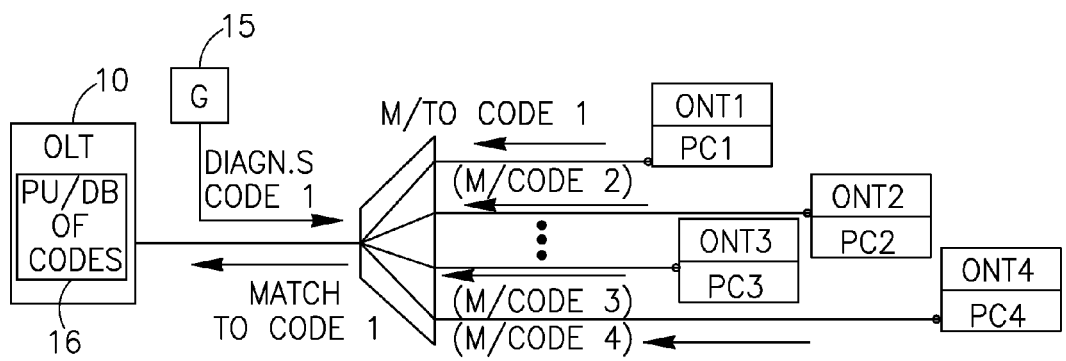

FIG. 2 schematically shows one example of the proposed arrangement of a system with diagnostic points in the PON network, provided with the proposed passive diagnostic tools.

Figure 3:
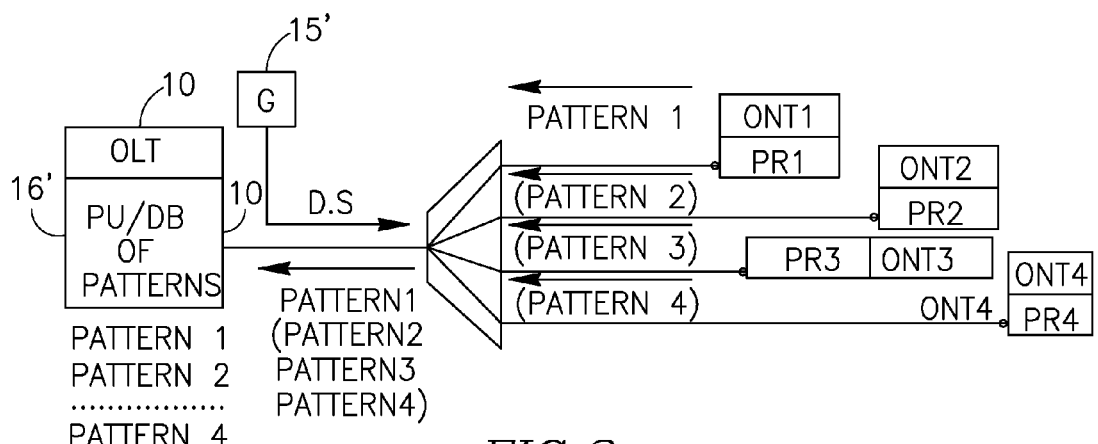

FIG. 3 schematically shows another example of the proposed arrangement of a system with diagnostic points in the PON network, provided with the passive diagnostic tools being pattern/image reflecting pixel-based optical devices.

Figure 4:
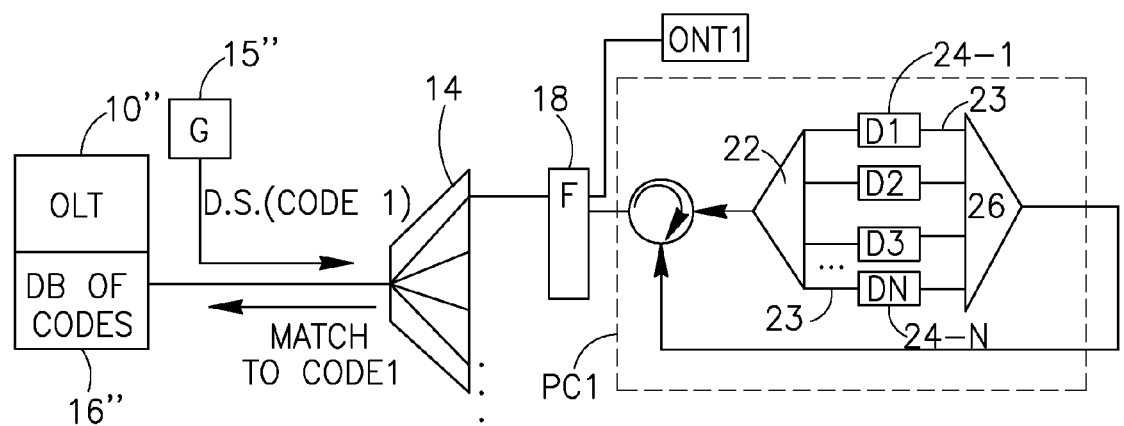

FIG. 4 schematically illustrates one example of the proposed optical correlator, built using optical delay elements.

DETAILED DESCRIPTION OF THE INVENTION

FIG. 1 shows a PON network with its OLT 10 incorporating an OTDR unit 12. The OTDR unit, via a splitter 14, transmits an optical diagnostic/probe signal towards a group of ONTs of the PON. The splitter (an array of waveguides) distributes the diagnostic signal, as well as any other downstream optical signal sent from the side of OLT, to all the ONTs (in this elementary illustration, ONT1, ONT2, . . . ONT4 . . . ). In this example, the diagnostic signal is returned by each of the ONTs at a specific power level which a) corresponds to a distance of the ONT from the splitter, and b) depends on the condition of the optical fiber at the end (shown in the drawing by pulses of different height at the side of ONTs). It is known that a fiber cut returns light of increased intensity. In the PON network, upstream signals from ONTs are mixed with one another in the common optical fiber leading to the OLT 10; moreover, the splitter 14 (especially if it is a cascaded one) always introduces high attenuation (up to 40 dB), and the optical signals received from the ONTs are quite difficult for detecting and sorting properly. On one hand, it is almost impossible to increase power of probe signals, since ONT equipment may be damaged by the increased power; on the other hand, if duration of the probe signals is increased, resolution of the returned signals may suffer due to the prolonged probe pulses. A typical picture of the OTDR response is shown as a consequence of the returning pulses appearing on the fiber connecting the splitter 14 and the OLT 10.

FIG. 2 illustrates one of the proposed embodiments of the PON network, where the diagnostics is arranged according to the invention. In order to prevent mixing of the returned upstream signals, the diagnostic signal generated by the Generator 15 carries different binary codes at different moments of time. These codes are selected from a collection of codes stored in a Data Base 16 of the processing unit PU of the OLT 10. Each of the ONTs is equipped with a unique diagnostic tool—passive correlator PC (four such tools are shown: PC1 . . . PC4) reacting only to one of the codes in the mentioned collection. (All codes in the collection are unique for the PON network shown in the drawing.) Therefore, to each of the codes transmitted from the generator 15, only one of the ONTs responds by sending a matching signal (in this case, by returning this same code towards the OLT unit). In this way, the response signals will never be mixed since other ONTs just cannot respond to a code which does not suit to them.

FIG. 3 schematically illustrates another embodiment of the proposed invention. Its structure is generally the same as in FIG. 2, but the data base 16' of the processing unit stores different patters or images instead of simple binary codes mentioned above in the description of FIG. 2. Generator 15' of the diagnostic signal may just send an optical carrier signal of a specific wavelength towards all the subscribers (ONTs). By another version, 15' may apply (to the carrier) different patterns or images stored in the data base 16', one by one. Each of the ONTs is associated with a diagnostic tool in the form of a passive reflector PR (in this specific example, PR1-PR4), which is configured to reflect (say, according to specifically adjusted mirror-implemented pixels) only one suitable pattern out of those stored in the data base. For example, one of the PRs returns a reflection in the form of a star, another—in the form of a cross, a third—in the form of a square, etc.

If the diagnostic signal is just a carrier optical signal, the processing unit of the OLT will be forced to analyze whether some of the expected images/patterns is absent in the received mixture of the pictures. In order to alleviate the task, the system may be arranged to shift receipt of the reflections in time or space, for example by using delay blocks and/or by using polarization of the matching optical signals. Other technologies for division of the matching signals in space, time/phase, frequency, etc. can be proposed.

If the diagnostic signal is initially provided and transmitted with a pattern/image, the matching signal in this example will be a reflection of that pattern returned by one and only one of the correlators PR1-PR4, which is preliminarily configured to that pattern. The pattern or image carried by the diagnostic signal may be controllably replaced by a next image stored in the database 16', so as to check the diagnostic points (ONTs) one by one.

FIG. 4 schematically shows how an exemplary diagnostic tool can be built. The OLT 10" is connected via a splitter 14 to a specific ONT1. The diagnostic signal generator 15" transmits a coded signal at a wavelength (say. 1650 nm) different than wavelengths used for transmitting data (say, 1310, 1400 nm). Now let a specific binary code (suitable to the ONT and therefore being the unique code of the ONT1) is carried by the diagnostic signal and is transmitted downstream. On the individual fiber leading to the ONT1, there is a filtering element 18 which allows separation of the data channels from the diagnostic channel. The diagnostic signal is further fed to an optical circulator 20 and to a splitter 22 which allows transmitting portions of the diagnostic signal in parallel, via a number of branches 23. Let the number of the branches corresponds to the length N of the binary code used in the diagnostic signal (i.e., of the diagnostic code). In this example, there are five branches corresponding to the diagnostic code having 5 binary positions (N=5). Each of the branches is equipped with a differently adjusted delay line D1 . . . DN marked 24-1, . . . 24-N. Let the delay lines 24 of that specific tool are adjusted so as to bring all "1"-levels of the diagnostic code to a combiner 26 simultaneously, thereby merging and amplifying the "1"-components of the diagnostic binary code. In other words, the reflected 1-s coincide in time and become summarized (accumulate); the sum of these "1"-s forms a resulting optical signal (the matching signal) comprising a peak of energy; thereby the correlator suitable to the code is adapted to return the matching resulting optical signal in response to the diagnostic signal. The obtained peak of energy is then fed to the circulator 20 and after that returned to the processing unit of the OLT.

It should be noted that the diagnostic tools of other ONTs (not shown in FIG. 4), which have differently organized delay lines, will not at all "return" the discussed specific code of the diagnostic signal (at least, will not return a signal having a predetermined threshold power), but will respectively return other codes suitable to their delay lines—thereby allowing very accurate discrimination between ONTs at the side of OLT.

It should be added that the diagnostic signal generator 15 (15', 15") may serve a number of PON networks, even by transmitting one and the same set of codes/patterns to different networks. Still, in each specific PON network comprising its own group of ONTs, the set of codes/patterns of the diagnostic signal will be unique, and each code/pattern will be unique for a specific ONT being responsive to it. The problem of distinguishing response signals arriving from different PON networks may be solved by connecting the generator to the networks selectively, via an optical switch (selector).

It should be appreciated that other versions of the method and various embodiments of the diagnostic tool and of the diagnostic system might be proposed, and that such versions and embodiments should be considered part of the invention whenever covered by the claims which follow.

The invention claimed is:

1. A method for locating faults in a passive optical network (PON), comprising:
providing a number of passive unique optical correlators at a number of respective diagnostic points of the PON, each of the passive unique optical correlators being configured to respond to a signal pattern representing a respective unique signature and being responsive to an optical diagnostic signal by returning a predetermined unique matching signal;
transmitting the diagnostic optical signal in said PON towards said diagnostic points, wherein said diagnostic signal comprises a plurality of respectively different signal patterns each representing a respective unique signature, each characterizing a specific passive optical correlator and each optical correlator being characterized by a respective one of the unique signatures that is different from the unique signature characterizing any other one of said optical correlators, thereby enabling generation of a matching signal by the specific optical correlator in response to receiving by said specific passive optical correlator the diagnostic signal that comprises a respective signal pattern,
receiving upstream response signals from one or more of said plurality of passive optical correlators which had received the diagnostic signal, detecting presence or absence, in said received response signals, of a predetermined unique matching signal expected from a specific optical correlator out of said optical correlators, and
judging about a fault in proximity of a specific diagnostic point, based on the presence or absence and/or a level of said specific matching response signal expected from the optical correlator placed in said specific diagnostic point.

2. The method according to claim 1, further comprising generating said diagnostic optical signal by selectively applying to a carrier optical signal one unique signature at a time, said unique signature being selected from a plurality of signatures unique for the PON and respectively associated with the number of passive unique optical correlators; detecting said predetermined unique matching signal, if returned by one of said unique passive optical correlators responsive to the unique signature carried by the diagnostic signal.

3. The method according to claim 1, further comprising judging, according to parameters of the matching signal, about distance up to said diagnostic point and/or condition of a communication line and/or equipment up to said diagnostic point.

4. The method according to claim 1, wherein said PON comprises an Optical Line Termination (OLT) connected via optical fibers to a plurality of Optical Network Terminations (ONTs),
the method further comprises
arranging said diagnostic points at least in proximity to one or more of the ONTs;
storing information on the plurality of unique signatures in a data base;
transmitting the diagnostic optical signal, in the direction from the OLT downstream, towards said ONTs;
receiving the upstream response signals from the ONTs;
associating the presence or absence of the predetermined matching signal, if detected, with the stored information on the plurality of unique signatures; and
in case of absence of the predetermined matching signal, locating a fault in a PON section preceding the optical correlator responsive to said specific unique signature.

5. The method according to claim 4, wherein said information on the plurality of unique signatures comprises said signatures, the respective matching signals, the respective passive correlators and their respective locations in the PON.

6. A diagnostic tool for use in a PON network, the diagnostic tool comprising a passive optical correlator to be connected to an optical fiber, and being responsive to an optical diagnostic signal carrying a specific unique signature if received at the passive optical correlator, by returning a predetermined unique matching signal and wherein the unique signature comprises a specific binary code applied to a carrier optical signal, and wherein the correlator comprises a number of delay elements arranged in parallel in such a manner that, all "1"-level pulses of said specific binary code, upon passing via the parallel delay elements, coincide in time and get summarized so that the sum thereof forms the predetermined matching signal; the correlator being adapted to return said predetermined matching signal in response to the diagnostic signal for further processing.

7. A software product stored on a computer readable non-transitory medium, comprising computer implementable instructions and/or data which, when executed by a computer processor, carry out the method according to claim 1.

* * * * *